Sept. 20, 1960    J. W. HUNT    2,953,020
METEOROLOGICAL APPARATUS
Filed March 16, 1956    2 Sheets-Sheet 1

INVENTOR:
James W. Hunt,

BY Homer R. Montague
ATTORNEY

United States Patent Office 2,953,020
Patented Sept. 20, 1960

2,953,020

METEOROLOGICAL APPARATUS

James W. Hunt, Victoria, Tex., assignor to Electroanalysis Company, Victoria, Tex. (a sole proprietorship of D. H. Braman)

Filed Mar. 16, 1956, Ser. No. 572,178

1 Claim. (Cl. 73—170)

This invention pertains to meteorology, and more particularly to apparatus for detecting lightning discharges and measuring their occurrence frequency, and to an improved method of correlating lightning discharge occurrences with other meterological factors for storm warning and allied purposes.

Basically, the invention depends for its operation upon the fact that there is a correlation between certain severe types of atmospheric storms and the occurrence of lightning discharges. It is of course well known that lightning flashes or discharges are often associated with storms of various kinds, but so far as is known no relationship has been discovered between such discharges and the severity of the storm; more important, from the viewpoint of the present invention, is that the practical use of such a correlation in a quantitative manner requires that the discharges be detected over considerable distances (for example, from 0 to 400 miles) in order to be of any value with respect to weather prediction, warning operations and the like. The present invention depends upon the observed existence of a correlation between the recurrence frequency of lightning discharges and severe storms, including tornados, this correlation holding good, within limits, regardless of the absolute intensities of the individual discharges, and regardless of the total energy represented thereby. In this as well as in other respects, the present invention is clearly distinguished from radar observation of storm cells or the like, which give information respecting the position and direction of storm areas, and in some cases their physical size, but do not permit determination of the severity of such storms, nor enable any estimate of the probability that tornado or other severe conditions may result.

The remote detection and measurement of the above conditions is, according to the invention, accomplished by sensing the electromagnetic field or wave energy created at a measuring location by the relatively remote discharges.

The invention is also to be distinguished from those procedures and apparatus which are directed to the measurement of the electrostatic field strength or the strength of received radio waves, such as are generally employed in the determination of propagation characteristics, static conditions and the like. In fact, in carrying out the present invention, care is exercised to reduce and if possible eliminate the effects of purely electrostatic fields, and to limit the measurements to the electromagnetic fields which distinguish lightning discharges from other sources of wave energy in the atmosphere.

It is accordingly a preferred object of the invention to provide apparatus by which the frequency of lightning discharges in nearby storm areas, if any, can be determined rapidly and accurately, and preferably automatically. By "nearby", in this sense is meant generally within a radius of several hundred miles, within which the existence of the conditions being measured can be detected with good accuracy and with important signifiicance. For forecast purposes, of course, the information obtained would be of little use unless the determination can be made at a considerable distance from the storm center, and well prior to a time at which the lightning flashes themselves could be detected visually or optically.

It is a further object of the invention to provide improved apparatus of the above kind in which the registration of the occurrence frequency of lightning discharges will be made substantially independent of the absolute magnitude of the discharges, in order to fulfill the accomplishment of the desired correlation between flash frequency (as distinguished from amplitude) and the conditions being measured.

A further object of the invention is to provide apparatus of the kind just mentioned which will automatically make a permanent record of the frequency of lightning discharges and of the azimuth or direction of the apparent source of the disturbances, to permit correlation of the results with other meteorological information including radar detection of weather cells. Such information is readily registered without the necessity for visual observation or photographic records, and is hence not limited to later perusal, perhaps at a time when the information will have merely statistical value. At the same time, where continuous photographic records of radar scope presentations are being made, it is entirely feasible to photograph at the same time, or even on the same film, the information presented by the lightning frequency apparatus.

Still another object of the invention is to provide a lightning frequency detector combined with an alarm or signal, which apparatus will continuously monitor a considerable area of terrain (several hundred miles in radius, for example) and will give an alarm whenever lightning frequency conditions indicate the presence of storms of the various severe types associated with high repetition rates of the lightning discharges. Such equipment is readily adapted to adjustment of the radius of sensitivity thereof, as well as of the minimum occurrence frequency at which an alarm will be given.

It is a further object of the invention to provide an apparatus for detecting and measuring the recurrence frequency of lightning discharges occurring entirely beyond the visual range at the measuring location, by means of measurements made of the electromagnetic field energy due to such discharges. To this end, the invention utilizes apparatus which is relatively insensitive to nearby sources of radio frequency noise. It is well known that the capacitance type aerial responds predominately to the electric component of a wave field, whereas a balanced or shielded loop antenna responds predominately to the magnetic component. In order to distinguish field energy associated with lightning discharges from other sources of radio frequency noise, which latter in many cases would mask the lightning effect, the invention preferably utilizes a shielded loop antenna and a shielded receiver to provide apparatus which is sensitive to the occurrence of lightning discharges occurring at considerable distances from the measuring location.

With the above objects and background description in mind, the invention itself will best be understood by referring to certain concrete exemplifications or embodiments of apparatus constructed in accordance with the principles of the invention, these being given by way of example and not of limitation, and taken in connection with the appended drawings, in which Fig. 1 is a perspective view partly in block form showing the general arrangement including recording means for flash frequency and azimuth.

Figure 1:
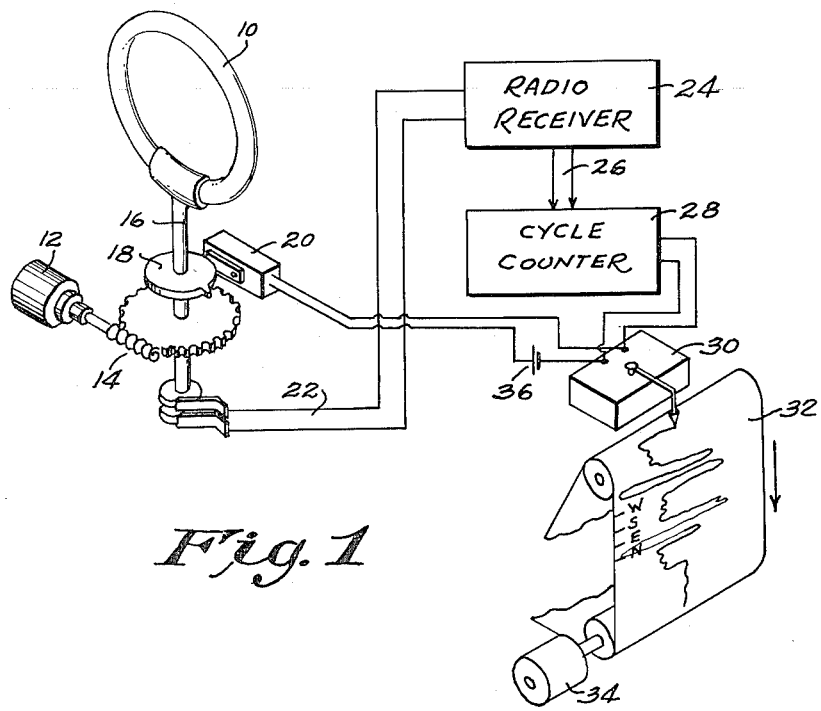

Referring now to Fig. 1 of the drawings, a complete system is indicated, the same including provision for making a permanent record of the flash recurrence frequency and indicating the direction or azimuth from the station to which the frequency pertains. This system operates automatically and continuously, without human supervision, and is well adapted for continuous studies of meteorological conditions. However, it is clear that the same system gives a continuous visual indication, besides the permanent record, and can therefore be utilized for forecast work if desired. The modification of this system to provide an audible alarm, when severe conditions are recorded, will be obvious to those skilled in instrumentation. Also, since the output indications can readily be converted to electrical signals for transmission to a remote point over land lines or radio link, this automatic apparatus is well adapted for collecting and transmitting the indications to a central point.

Referring specifically to the elements which make up the system of Fig. 1, numeral 10 designates a rotating loop antenna, preferably of the shielded type which will respond predominately to the electromagnetic field component associated with lightning discharges. The antenna 10 is rotated continuously in azimuth as by a motor 12 and gearing 14 connected to the vertical shaft 16 of the loop. Cam 18 is also secured to shaft 16 for rotation therewith, this cam having a lobe arranged so as to close a switch 20 when the directional axis of the loop points in a certain direction during each revolution. For convenience, the switch 20 will be arranged to close momentarily as the loop direction passes through true North. The purpose of this switch 20 will be described below.

The wave signal from antenna 10 is applied over conductors 22 to a conventional radio receiver 24, which is adapted to receive amplitude modulated radio energy, and to detect and amplify the same to provide an audio frequency output signal at the output terminals 26. Receiver 24 may be of the super-heterodyne or tuned radio frequency type or the like. The output at terminals 26 will consist of audio bursts indicative of lightning discharges within the range of the receiver 24, so long as the receiver is not tuned to any carrier frequency corresponding to communication channels in use within its sensitivity range. The sensitivity of receiver 24 is adjusted so that there is substantially no output at terminals 26 due to ordinary static or the like; in fact, the receiver is preferably adjusted so that only bursts of radio frequency energy above a certain level will be transmitted to the following components.

The carrier frequency to which the receiver 24 is tuned will have to be selected in accordance with conditions existing at the particular site. Thus, it is known that the wave energy accompanying lightning discharges is limited principally to the low frequency portion of the entire radio spectrum, being substantial in the standard broadcast range and at lower frequencies, and falling off rapidly at the higher frequencies extending into the VHF and UHF ranges. Hence, receiver 24 may be a standard broadcast receiver, or one tuned to even lower frequencies, and in fact it may be rather broadly tuned in areas where it is not necessary to avoid interference from commercial transmitters. A frequency of 175 kilocycles per second has been found to be very good.

The audio signal energy at terminals 26 of the receiver is applied to a cycle counter 28 which has the function of amplifying (if necessary) this energy, and rectifying the same and applying the rectified output pulses to a repetition-frequency detecting circuit which will be described below. The output of cycle counter 28 is a varying direct current voltage indicative of the recurrence frequency of lightning flashes having energy greater than a certain threshold determined by the sensitivity adjustments of the components. This varying direct current potential is applied to the galvanometer coil 30 of a conventional pen recorder 32, having the usual paper record which may be fed in the vertical direction by a drive motor 34 as is well known to those familiar with such instruments.

Inasmuch as the loop antenna 10 is rotated at a constant speed by motor 12, it is convenient to mark the time axis on the record chart of recorder 32 in terms of the direction of the loop. Thus, loop 10 may make one rotation each 15 minutes, in which case a 15 minute span on the record of recorder 32 can be marked with angles or compass indications ranging from north through east, south and west back to north. If desired, the chart may also bear a time scale or time and date indications in the usual way. The deflections of the inked pointer driven by galvanometer movement 30 will conveniently be in the lateral direction on the chart, so that a permanent record may be made of the lightning flash recurrence frequency for each position of the loop antenna during all quarter-hour periods making up a day or longer interval.

The above described arrangement depends upon the maintenance of synchronism between motors 12 and 34. Since it will not usually be feasible to connect the shafts of these motors, allowance may be made for any errors by causing the inked pointer to swing to an extreme position, such as the left hand position on the chart, once during each rotation of loop antenna 10. Fig. 1 illustrates this feature, the switch 20 operating momentarily as the antenna rotates through the North direction, and completing a circuit including a battery or equivalent source 36 to deflect the pointer of the galvanometer 30 to one end of its travel. These extreme deflections will provide the chart with accurate azimuth markings irrespective of any direction calibration which may be associated with the chart itself.

As has been indicated above, the invention depends for its operation upon the existence of a correlation between the frequency of occurrence of lightning flashes or discharges in a region, and the existence of severe weather conditions in that region. Without limiting the invention to a particular theory of operation, it may be assumed that the frequency of lightning recurrence is in some manner dependent upon the rate at which electrical charge accumulates as between a cloud, say, and the earth. It is important here to distinguish between the total amount of energy involved in a lightning burst, or in a series of such bursts, and the recurrence frequency. It has been found that merely integrating the frequency and intensity of the associated electromagnetic radiations does not provide a useful indication of the meteorological importance of the phenomena being observed. Perhaps this is due to the fact that the integrated energy observed at a relatively remote station is necessarily conditioned by the distance from this station to the storm center, a factor which would of course have no bearing upon the actual intensity of the meteorological action involved in a particular storm center. However that may be, it has been found that a good indication of the absolute importance of remote weather conditions can be obtained from the recurrence frequency of bursts of electromagnetic wave energy associated with lightning, the only amplitude or intensity requirement being the elimination of static and other more or less continuous signals of relatively lower intensity than those associated with lightning. It is realized that very remote lightning discharges (because of the laws governing the falling off of electromagnetic signal strength with distance from the source) will be undetected, because their magnitude will be not appreciably greater than the background static or "white" noise normally associated with wave propagation in the atmosphere. This sets a distance limit beyond which the invention cannot operate. Within such limit, however, the recurrence frequency of discharges of sufficient strength to be recognized as lightning (either by themselves or in connection with collateral information on approaching storms) has been found to give a useful indication of the severity of the weather conditions.

In practice, the method is carried out by sensing the electromagnetic radiations of appropriate "carrier" frequency (that is, those located in the band or spectrum portion covered by the radio receiver described above), with the sensitivity of the receiver adjusted so that only substantial bursts of energy exceeding the normal background are allowed to pass. The actual frequency of occurrence of these bursts is then determined for each unit of time, as in lightning strokes per second or minute or in similar units, and this figure indicates the severity of the conditions being investigated. It must be realized that this is a quite different procedure from measuring the field strength due to the lightning, and from measuring its total energy, because I have found that measurements of the latter type have no appreciable significance insofar as remote conditions are concerned.

It should also be realized that the method of the invention can be carried out in various ways. For example, it would be possible to sense all bursts of electromagnetic radiation in a given spectrum range, and to count those whose magnitude exceeds a certain limit, or to impose a preliminary standard of intensity upon those to be counted, and count all which, exceeding this limit, are presumed to represent lightning strokes. Most conveniently and accurately, however, I prefer to utilize apparatus in which the discrimination and counting is effected purely automatically, and to this end utilize equipment best shown in Fig. 2 of the drawings.

Figure 2:
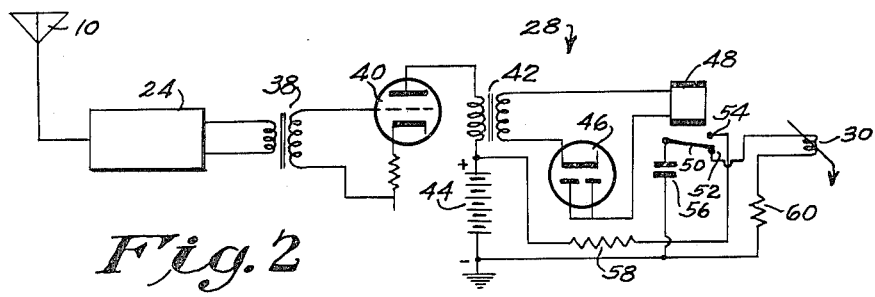
Fig. 2 is a schematic diagram showing the circuitry within certain of the components of Fig. 1.

In Fig. 2, reference numerals 10 and 24 again represent, in abbreviated form, the antenna and radio receiver. The latter is set to a gain such that bursts of electromagnetic energy detected thereby correspond to lightning discharges. The usual audio output signals of this receiver may be transformer coupled, as indicated, to the cycle counting apparatus 28, which is shown in more detail than in Fig. 1.

The output winding of coupling transformer 38 is connected to the input (grid-cathode) electrodes of an amplifier tube 40, the space current path of which passes through the primary winding of a second transformer 42 and thence to the source of anode supply voltage shown as a battery 44. Usual ground return circuits, grid bias source and the like are to be understood, and are omitted from the drawing since they form no essential part of the present invention. Thus, the secondary winding of transformer 42 develops voltage surges corresponding to individual bursts of the electromagnetic energy produced by the remote lightning discharges. These surges will be alternating in character because of the usual transformer action, and they are rectified by the diode rectifier 46 and applied to the winding of a direct current relay 48. The moving contact of this relay, designated 50, engages a fixed contact 52 when the relay coil is de-energized, but when a lightning stroke is being registered, contact 50 engages a second fixed contact 54.

A storage capacitor or condenser 56 has one terminal connected to the moving contact 50, and its other terminal connected to one side of a convenient source of direct current potential, which may be the source 44, for example. The other side of source 44 is connected through a resistor 58 to the "front" or normally open contact 54 of relay 48; that is, the contact which is not engaged by the relay arm when its coil is de-energized. Thus, when relay 48 is repeatedly energized, the condenser receives a charge which is a function of the number of strokes registered, and between strokes the relay releases to deliver the condenser charge via back contact 52 to recorder 30. The pulses delivered to the recorder are thus proportional only to the frequency of flash occurrence, which is the significant parameter desired to be observed.

The discharge circuit includes the condenser, resistance 60 and the inductance (and minor resistance component) of the galvanometer coil, and forms a time-constant circuit which determined the rate of discharge of the condenser. The value of resistor 60 is set or selected so that the recorder registers full scale for a relay operating frequency of about 70 cycles per second. The recorder scale can then be calibrated for values of lightning recurrence from zero to this maximum figure.

Preferably, this galvanometer will be of the ballistic type, having considerable inertia, so that the needle position will correspond to the time integral of all charges delivered to the coil during a representative period. Hence, the deflection of the needle will be a function of the number of times (per second, minute or other time unit) that relay 48 is energized. In this way, the apparatus ensures that only the frequency of strokes, regardless of their individual intensities, is indicated and recorded.

For lightning counting purposes, it appears to be unnecessary to register frequencies greater than 60 or 70 per second, so that a cycle counter of the above type provides a simple and adequate mechanism for the purpose; it has the additional advantage that it can readily be made to indicate even a very slow burst frequency, one which would not be indicated by usual frequency meter techniques.

Figure 3:
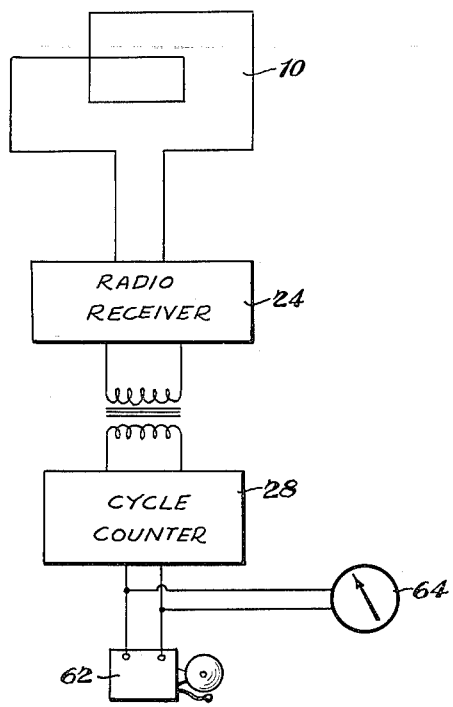
Fig. 3 is a block diagram, partly schematic, showing a simplified system adapted to operate an alarm.

Fig. 3 of the drawings shows a simplified version of the equipment suitable for automatic warning purposes. In this case, the recorder is omitted, and the output of the cycle counter 28 is utilized to operate the circuit of a bell 62, signal light or the like, in addition to a simple milliammeter type of indicator 64 for visual observation. The counter is set so that the alarm operates only when the stroke frequency exceeds a predetermined level. Such arrangement does not require a rotating antenna, and indeed the control signals can be derived from an ordinary home receiver connected to a non-directional antenna. This installation might have only sufficient sensitivity as to operate from storm conditions within a 50 mile radius of the station.

It will be obvious from what has been said that the invention lends itself to various applications in meteorological study and storm warning and the like; thus, two or more stations can be used as the base for a distance and direction finding system for storms using the principle of triangulation, or the recordings of a single station can be photographed in association with radar storm tracking scope indications for research or analysis.

While the invention has been described in connection with certain preferred embodiments of the apparatus, it is to be understood that various modifications can be made without departing from the spirit of the invention; hence, the invention is not to be deemed limited to the specific details mentioned above, except as required by the scope and meaning of the appended claim.

What is claimed is:

Meteorological apparatus for the detection and measurement of conditions associated with lightning discharges, comprising a radio frequency wave receiver for amplifying and detecting burst of electromagnetic radiations of greater than a predetermined magnitude and of wave lengths produced by lightning discharges, a directional antenna coupled to the input circuit of said receiver, means for rotating said antenna continuously in azimuth, a counter connected to the output of said receiver for indicating the occurrence frequency of such bursts of radiations arriving at said antenna from various directions, and means controlled by said counter for registering the average occurrence frequency for all such directions.

References Cited in the file of this patent

UNITED STATES PATENTS

| 1,320,291 | Swan | Oct. 28, 1919 |
| 1,893,337 | Patterson | Jan. 3, 1933 |
| 2,283,919 | Diamond | May 26, 1942 |
| 2,516,389 | Hurvitz | July 25, 1950 |